United States Patent [19]

Howland

[11] 4,122,354

[45] Oct. 24, 1978

[54] INTERNAL COMBUSTION ENGINE STARTING CIRCUIT

[75] Inventor: Leland L. Howland, Belle Plaine, Minn.

[73] Assignee: Thermo King Corporation, Minneapolis, Minn.

[21] Appl. No.: 785,272

[22] Filed: Apr. 6, 1977

[51] Int. Cl.[2] .......... H02K 23/52

[52] U.S. Cl. .......... 290/31; 290/46; 123/179 B

[58] Field of Search .......... 290/10-13, 290/19, 31-35, 22, 25, 26; 322/29, 30; 123/179 B

[56] References Cited

U.S. PATENT DOCUMENTS

| | | | |
|---|---|---|---|
| 1,087,950 | 2/1914 | Jones et al. | 290/22 |
| 1,396,309 | 11/1921 | Young | 290/35 |
| 1,790,635 | 1/1931 | Arendt | 290/10 |
| 2,307,364 | 1/1943 | Elkin | 290/31 |
| 2,806,962 | 9/1957 | Quantz | 290/31 |

*Primary Examiner*—Robert K. Schaefer
*Assistant Examiner*—John W. Redman
*Attorney, Agent, or Firm*—F. E. Blake

[57] ABSTRACT

An internal combustion engine starting circuit for a system including a combination direct current motor generator unit having an armature coil and field coil in series therewith to be connected to a source of direct current to function as a starter motor when the ignition switch is first closed and to function as a generator when the internal combustion engine starts to bring the motor generator unit to generating speed is provided with a starting solenoid to be energized to close a contact for connecting the motor generator unit to the source when energized. An ignition switch is adapted to be closed to complete a circuit through one coil of a double coil starting relay having a normally open contact to be closed to energize the starter solenoid in series with the ignition switch and the source. The other coil of the starting relay is connected in parallel to the series field of the motor generator to thereby be energized to buck the field of the one coil and automatically open the starter relay contact to deenergize the starter solenoid when the engine has started and the motor generator unit reaches generating speed.

4 Claims, 1 Drawing Figure

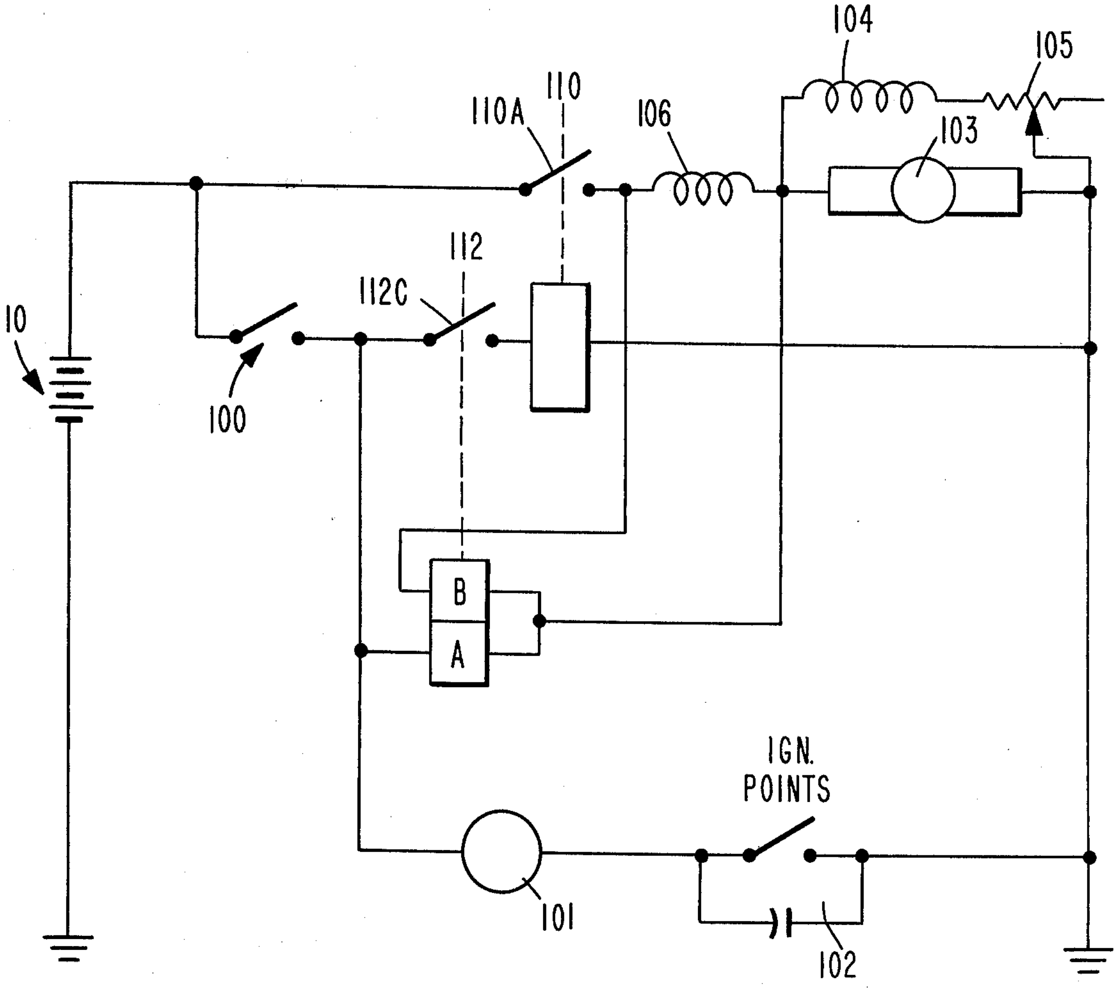
104
105
110
110A
106
103
112
112C
10
100
B
A
IGN.
POINTS
101
102

INTERNAL COMBUSTION ENGINE STARTING CIRCUIT

BACKGROUND OF THE INVENTION

Many transportation refrigeration units are powered by internal combustion engines and it is desirable that the starting circuits for such engines by as simple and reliable as possible for remote control operation by the operator of the vehicle having such transportation refrigeration equipment. It is known to provide such internal combustion engine arrangements with a combination electric starting motor and battery charging generator unit for use with direct current source such as the storage battery commonly provided for the refrigeration unit internal combustion engine. When a combination starting motor generator unit is used, the prior art starting circuit arrangements have been complicated by the need to switch the combination motor generator unit from the starting motor circuit mode to a generator circuit mode and it is desirable to simplify the circuits so that only a single ignition switch is required to be operated to start the engine and automatically switch the combination motor generator unit from starter circuit mode to generator circuit mode.

PRIOR ART

U.S. Pat. No. 2,806,962, Sept. 17, 1957, to C. C. Quantz, discloses a generator regulating circuit using a dual coil relay but does not disclose the particular arrangement of the subject invention as provided for the use with a combination starting motor and generator unit.

SUMMARY OF THE INVENTION

In accordance with the invention, a combination direct current motor and generator unit is provided with an armature coil and a series field coil to be connected through a starter solenoid contact to a battery source of direct current in the starting circuit mode when the starter solenoid is energized. A double coil starting relay is provided with one coil to be connected to the battery through an ignition switch contact and the starter motor armature coil when the ignition switch is closed. This energization of the one coil of the starting relay causes its contact to be closed to connect the starter solenoid in series with the ignition switch to the source thus closing the solenoid contact and energizing the starter motor generator unit from the battery source in the starter circuit mode. The other coil of the double coil starting relay is connected in parallel with the series field coil of the motor generating unit and to the one coil of the starting relay and the ignition switch to the source so that when the engine starts and the motor generator reaches generating speed, the voltage developed across the series field passing through the other coil of the starting relay produces a field bucking the field of the one coil to effectively deenergize the dual coil starting relay and opening its contact to deenergize the starting solenoid switch coil, thus opening the starter motor circuit and converting the circuit to the generator circuit mode with the generator then connected to the battery source through the coils of the starting relay and the ignition switch contact.

Other features and advantages of the invention will be apparent with reference to the following detailed disclosure in connection with the detailed circuit to be referred to.

DESCRIPTION OF THE DRAWINGS

FIG. 1 is a circuit diagram of the invention.

DETAILED DESCRIPTION OF THE INVENTION

The combined starting and generating circuit of the invention for use with a system having a dual function starting motor and generating unit is shown by FIG. 1 of the drawings and is used with a direct current source such as a battery 10. Normally open ignition switch 100 is provided and when closed for operation of the circuit causes the one coil A of the double coil starting relay 112 to be energized from the source 10 in series with the armature coil 103 of the motor generating unit. The energization of the coil A of the double coil relay 112 causes starting relay contact 112C to be closed to energize the starter solenoid coil 110 from the ignition switch 100 and battery 10. The energization of the starter solenoid coil 110 closes the starter contact 110A to connect the series field 106 and the armature 103 of the combination motor generator unit to the battery source 10. The other coil B of the starting relay 112 is connected in parallel to the series field 106 so that when the motor generator unit is driven to and beyond generating speed by the starting of the internal combustion engine, the other coil B will be energized in a manner to buck the field of coil A and open contact 112C to deenergize the starter coil 110 and open the starter contact 110A. Thus the circuit is automatically reconnected in a generating mode with the generator voltage through the coils of the double coil relay 112 and the ignition switch 110 to the battery source 10. In reviewing the foregoing description and function it will be seen that the double coil relay functions to energize the starting motor solenoid to connect the circuit in a starting mode and then automatically switch the circuit to a generating mode when the internal combustion engine starts bringing the combination motor generating unit up to and beyond generating speed.

The internal combustion engine ignition coil 101 together with ignition points and capacitor 102 are connected in series through the ignition switch 100 to the battery source 10.

It may be desirable to control the sensitivity of response of the double coil relay 112 so that precise tuning of the electric parameters of the double coil relay with the combination motor generator unit is not required. For this purpose, in the preferred arrangement of the invention, a shunt field coil 104 and an adjustable resistor 105 may be connected in parallel with the armature coil 103 of the motor generator unit. Thus by a simple adjustment of the rheostat 105 the speed of the motor generator unit at which generating voltage sufficient to switch the double coil relay 112 and open contact 112C when switching the circuit from starting mode to generating mode may be predetermined without precisely tuning the electrical characteristics of the double coils of the starting relay 112. It will be borne in mind that the generating mode of the invention connects the generator to the source 10 through the ignition switch 100 and both coils A and B of the starting relay so that the generating mode of the circuit is effective after the starting solenoid 110 has been deenergized to open the solenoid switch contact 110A. Various modifications will occur to those skilled in the art.

I claim as my invention:

1. An internal combustion engine starting circuit for a system having a combination direct current electric starting motor generator unit comprising, a starter solenoid switch, an ignition switch, a dual coil starting relay switch, a series field coil connected in series with the armature coil of said motor generator unit, a source of direct current, said solenoid switch having a normally open contact to be closed to connect said motor generator series connected field and armature coil to said source when its coil is energized, one coil of said dual relay switch being connected in series with said ignition switch and said motor generator armature to said source when said ignition switch is closed to thereby close the relay switch, and the other coil of said relay being connected in parallel with said series field of said motor generator and to said one coil in a manner to buck the field of said one coil and open said relay switch when the voltage across said series generator field increases as the engine starts and the motor generator unit reaches generating speed to thus open its contact and de-energize said starter solenoid with the generator field and armature remaining in circuit with the source through the closed ignition switch and the coils of said relay.

2. The invention of claim 1 further having an ignition coil and points connected to said source through said ignition switch.

3. The invention of claim 1 in which a circuit comprising shunt field and an adjustable resistor is connected in parallel with the armature coil of said motor generator to control the sensitivity of response of the dual coil relay to the speed of the motor generator unit.

4. The invention of claim 3 further having an ignition coil and points connected to said source through said ignition switch.

* * * * *